(12) United States Patent
Wong

(10) Patent No.: US 8,836,278 B2
(45) Date of Patent: Sep. 16, 2014

(54) ELECTRICAL DEVICES AND METHODS OF CHARGING

(75) Inventor: Hon Yee Wong, Hong Kong (HK)

(73) Assignee: City University of Hong Kong, Hong Kong (CN)

(*) Notice: Subject to any disclaimer, the term of this patent is extended or adjusted under 35 U.S.C. 154(b) by 0 days.

(21) Appl. No.: 11/566,864

(22) Filed: Dec. 5, 2006

(65) Prior Publication Data

US 2007/0127184 A1 Jun. 7, 2007

(30) Foreign Application Priority Data

Dec. 5, 2005 (GB) .................................. 0524790.3

(51) Int. Cl.
*H02J 7/00* (2006.01)
*H02J 7/02* (2006.01)
*H01F 38/14* (2006.01)

(52) U.S. Cl.
CPC *H02J 7/025* (2013.01); *H01F 38/14* (2013.01)
USPC .......................................... 320/108; 320/114

(58) Field of Classification Search
USPC ........................................................ 320/108
See application file for complete search history.

(56) References Cited

U.S. PATENT DOCUMENTS

| 3,277,358 | A | * | 10/1966 | Nicholl | 320/111 |
| 3,885,211 | A | * | 5/1975 | Gutai | 320/108 |
| 6,808,288 | B2 | * | 10/2004 | Mah | 362/192 |
| 7,164,255 | B2 | * | 1/2007 | Hui | 320/108 |
| 2002/0043957 | A1 | * | 4/2002 | Krainer | 320/108 |
| 2005/0088842 | A1 | * | 4/2005 | Mah | 362/157 |
| 2006/0061326 | A1 | * | 3/2006 | Vine et al. | 320/108 |
| 2006/0205381 | A1 | * | 9/2006 | Beart et al. | 455/343.1 |

FOREIGN PATENT DOCUMENTS

WO    WO 03/105308 A1    12/2003    ............ H02J 7/00

* cited by examiner

*Primary Examiner* — Edward Tso
*Assistant Examiner* — Johali Torres Ruiz
(74) *Attorney, Agent, or Firm* — Heslin Rothenberg Farley & Mesiti P.C.

(57) ABSTRACT

An electrical device of the type having a rechargeable battery and which has a body having at least a portion formed with a circumference extending about an axis, is provided with a secondary winding adapted to receive magnetic flux from a planar charging surface that is arranged around the circumference in a plane perpendicular to the axis. Such a device may be charged by placing the device on a planar charging surface such that the body portion contacts the planar charging surface with the axis perpendicular to the charging surface and the secondary winding parallel to the charging surface.

11 Claims, 2 Drawing Sheets

ELECTRICAL DEVICES AND METHODS OF CHARGING

CROSS-REFERENCE TO RELATED APPLICATIONS

This application claims priority to United Kingdom Application No. 0524790.3, filed Dec. 5, 2005, which is herein incorporated by reference in its entirety.

FIELD OF THE INVENTION

This invention relates to electrical devices, and in particular to electrical devices designed to facilitate their charging by means of a planar inductive charging platform.

BACKGROUND TO THE INVENTION

Conventionally, electrical devices that are operated by means of an internal rechargeable battery are provided with means for enabling that battery to be recharged as necessary. In the past such devices have been provided with a charging socket and a charging adaptor. The charging adaptor is usually an AC/DC adaptor that is connected to the electrical mains supply and normally outputs to the charging socket a controlled DC supply voltage suitable for charging a particular battery.

A disadvantage with such conventional arrangements, however, is that with the proliferation in various types of portable electrical devices most users of such devices have to have a corresponding number of charging adaptors which may be mutually incompatible. Many charging adaptors may be designed to work with one device only.

To overcome this problem, at least one wireless charging platform has been proposed. One example of such a wireless platform is described in HUI, Ron, Shu-yuen, International Publication No. WO 03/105308 A1, entitled "Planar Inductive Battery Charger," published on Dec. 18, 2003 (hereinafter referred to as "WO03/105308"), and which is herein incorporated by reference in its entirety. In this design, a planar wireless charging platform is proposed upon which devices to be charged may be placed. Underneath the surface of the charging platform there is an array of primary coils that generate lines of magnetic flux that extend generally perpendicular to the surface of the charging platform. A device to be charged (for example, a mobile phone) is provided with an integral (or external) secondary coil so that when the device is placed on the charging surface, magnetic flux passes through the secondary coil and generates a voltage therein. The voltage that is generated may be used to charge the battery within the device.

In principle, the arrangement disclosed in WO03/105308 is advantageous, since a large number of different devices can be charged (potentially simultaneously) by simply placing the devices on the single charging surface, and consequently the need for multiple charging adaptors can be reduced. In practice, however, there may still be some issues that need addressing for the charging platform of WO03/105308 to gain widespread acceptance. One issue, for example, is use of the charging platform with electrical devices that are not provided with an integral secondary coil. One approach to this is also described in WO03/105308 and uses adaptors that are provided with secondary coils that can receive magnetic flux from the surface of the charging platform and output a DC voltage to a conventional charging socket.

Furthermore, even with electrical devices provided with an integral secondary coil, for certain devices locating a secondary coil in a suitable position may be easier than it may be for other devices. It should be noted, for example, that for maximum efficiency, the secondary coil should be located in a plane such that when the device is placed on the charging surface, the secondary coil is parallel to the charging surface. This maximizes the magnetic flux passing through the secondary coil and increases the efficiency of the energy transfer. For electrical devices that have at least one generally planar surface, for example, a mobile phone, this may be quite easy to achieve as the secondary coil may be positioned parallel to the planar surface such that the electrical device can simply be placed on the charging surface with the planar surface in contact with the charging surface. In this way, the secondary coil will be close to and parallel to the charging surface.

However, for electrical devices of other shapes (especially devices with curved surfaces) finding a suitable location for the secondary coil may be less straightforward.

SUMMARY OF THE INVENTION

An object of the present invention therefore is to provide methods of integrating a secondary coil into a range of electrical devices so that they may be used with a planar battery charging platform of the type described in WO03/105308.

According to the present invention there is provided an electrical device. The device includes a body having a portion formed with a circumference extending about an axis, a rechargeable battery housed within the body, a first connection circuit in connection with the rechargeable battery disposed within the body, and a removable cap adapted to fit over and at least partly surround the body portion. The cap includes an integrally formed secondary winding surrounding the body portion about the axis, the secondary winding being adapted to receive magnetic flux extending from a planar charging surface. The cap further includes a layer of magnetic material disposed between the secondary winding and the body portion for reducing current induced in the body of the electrical device, and a second connection circuit for connecting the secondary winding to the first connection circuit so as to charge the rechargeable battery in the body. The cap is arranged to be in contact with the planar charging surface and to support the electrical device on the planar charging surface during charging of the electrical device, and the secondary winding is arranged to be substantially parallel to the planar charging surface so that lines of magnetic flux extending from the planar charging surface pass substantially perpendicularly through the secondary winding during charging of the electrical device.

In preferred embodiments of the invention the body portion may have a generally circular cross-section and the secondary winding may therefore also be circular. Examples of such products include, for example, a handheld flashlight having a basically circular body and head portion or a camera having a lens portion extending from the camera body. The invention could also, however, be applied to other devices having portions with other cross-sections such as oval or square cross-sections. What is critical is that the secondary winding can extend around a circumference of a portion of the device, and that the device can then be placed on the charging surface such that the secondary winding is parallel and close to the charging surface for maximum charging efficiency.

The secondary winding may be formed either integrally with the body portion of the device itself, or may be formed integrally with a cap or other form of protective device that is adapted to fit over the body portion.

Preferably, especially if the body of the electrical device is formed of metal either completely or substantially, magnetic shielding may be provided between the secondary winding and the remainder of the body of the device so as to minimize the amount of flux that passes through the metal body and to minimize consequential induction heating in the body.

In another aspect, a cap for an electrical device is provided. The cap is removably fitted over and at least partly surrounding a body portion of an electrical device, and includes an integrally formed secondary winding surrounding the body portion, the secondary winding being adapted to receive magnetic flux extending from a planar charging surface, a layer of magnetic material disposed between the secondary winding and the body portion of the electrical device for reducing current induced in the body of the electrical device, and a connection circuit for connecting the secondary winding to the electrical device so as to charge a rechargeable battery in the electrical device. The cap is arranged to be in contact with the planar charging surface and to support the electrical device on the planar charging surface during charging of the electrical device, and the secondary winding is arranged to be substantially parallel to the planar charging surface so that lines of magnetic flux extending from the planar charging surface pass substantially perpendicularly through the secondary winding during charging of the electrical device.

In another aspect, an apparatus is provided. The apparatus includes a cap for an electrical device, the cap being adapted to be removably fitted over and at least partly surround a body portion of an electrical device. Further, the cap includes an integrally formed secondary winding to surround the body portion when present, the secondary winding being adapted to receive magnetic flux extending from a planar charging surface when present, and a layer of magnetic material situated such that when the cap is removably fitted over the body portion, the layer of magnetic material is disposed between the secondary winding and the body portion of the electrical device for reducing current induced in the body of the electrical device. The cap is configured for placing in contact with the planar charging surface when present and to support the electrical device on the planar charging surface during charging of the electrical device, and the secondary winding is arranged to be substantially parallel to the planar charging surface when present so that lines of magnetic flux extending from the planar charging surface pass substantially perpendicularly through the secondary winding during charging of the electrical device.

BRIEF DESCRIPTION OF THE DRAWINGS

Some embodiments of the invention will now be described by way of example and with reference to the accompanying drawings, in which.

DETAILED DESCRIPTION OF PREFERRED EMBODIMENTS

Figure 1:
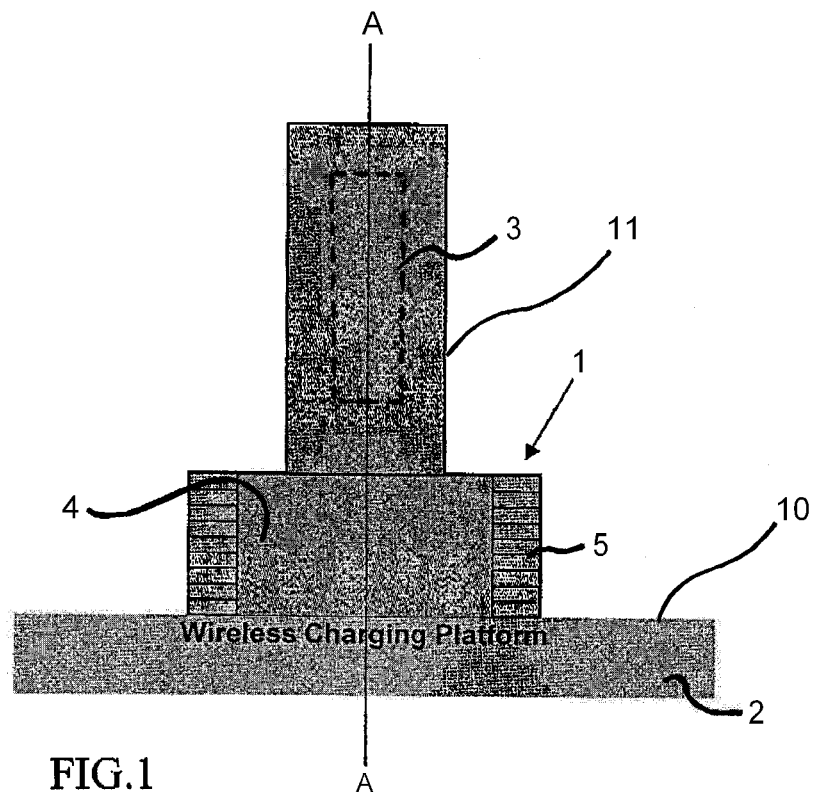
FIG. 1 is a side view of one example of an electric flashlight according to one aspect of the invention placed upon a planar inductive charging platform.

Referring to FIG. 1 there is shown an electric device such as a flashlight 1 that is placed on a planar charging surface 10 of a charging platform 2. The charging platform 2 is of the type described in WO03/105308, and in particular generates lines of magnetic flux that extend perpendicular to the charging surface. The flashlight 1 is provided with one or more rechargeable batteries (e.g., rechargeable battery 3) that are designed to be charged by the charging platform. The flashlight has a generally cylindrical main body portion 11 that houses the battery, and a head portion 4 that houses the light bulb, reflector and protective glass or plastic (not shown) in a conventional manner. The head portion 4 has a circular cross-section perpendicular to an axis A-A that extends through the head portion 4 and also through the main body portion 3 of the flashlight. It will be seen from FIG. 1 that when the flashlight 1 is to be charged, it is preferably placed on the charging surface 10 vertically so that the flashlight 1 is stood on one end with the head portion 4 of the flashlight contacting the charging surface. In this position, the axis of the flashlight is perpendicular to the charging surface.

For the battery of the flashlight to be recharged by the charging platform, it is necessary to provide a secondary winding (the primary winding is provided as part of the wireless charging platform) that is adapted to receive magnetic flux from the charging surface 10 and to generate a charging voltage as a consequence of the received magnetic flux passing through the coil. In the example of FIG. 1, a secondary winding 5 is formed integrally with the head portion 4 of the flashlight 1. In particular, the secondary winding 5 comprises at least one coil (and preferably multiple coils) of a conductive material extending around the circumference of the head portion 4 of the flashlight. In this way, the secondary winding 5 can be formed in a very simple manner and yet be integrated with the structure of the flashlight 1. When the flashlight 1 is stood on the charging surface 10 with the head portion 4 oriented down so that it contacts the charging surface, then the secondary winding 5 will be parallel to the charging surface and close to the charging surface so that the maximum amount of magnetic flux will pass through the secondary winding 5. This will optimize the charging of the rechargeable battery. Suitable circuitry (not shown), including, for example, a DC voltage regulator, may be provided connecting the secondary winding 5 with the battery as will readily be understood by those skilled in the art.

Figure 2:
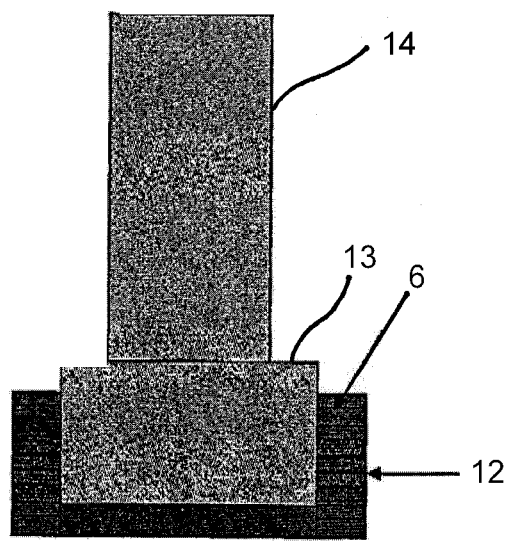
FIG. 2 is a side view of another example of a flashlight according to another aspect of the invention.

FIG. 2 shows a variation of the example of FIG. 1, but where the secondary winding 12 comprises at least one coil, and preferably multiple, that is provided in a cap 6 that may be used to cover and protect the head portion 13 of the flashlight. In such a case, the secondary winding 12 may be connected to the rechargeable battery using a charging cable (not shown), which may be fixed if the cap 6 is designed to be permanently attached to the flashlight 1, or may plug into the flashlight body 14 to connect to a charging circuit if the cap is designed to be removed completely from the flashlight.

The embodiments of FIGS. 1 and 2 are particularly suitable if the body of the flashlight is made of plastic or some other form of non-conductive material. However, if the flashlight body is made of metal or some other conductive material, then there may be problem in that the magnetic flux from the charging surface may induce currents in the body of the flashlight. Apart from being inefficient, this could cause the flashlight body to heat and either damage the flashlight or cause potential injury to anybody picking tip the flashlight.

Figure 3:
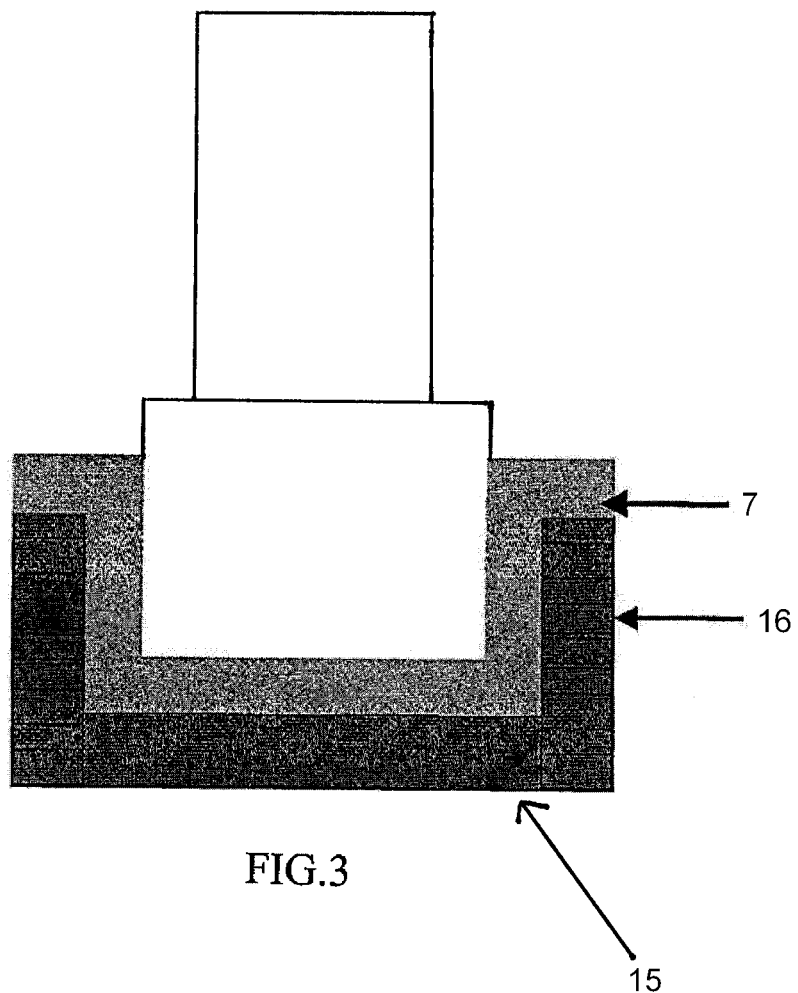
FIG. 3 shows detail for a variation of the example of FIG. 2.

FIG. 3 shows a variation of the example of FIG. 2 that is designed to mitigate the above-noted problem. In particular, in the example of FIG. 3, the cap 15 is provided with an interior layer 7 of magnetic material that when in use will be located between the cap 15 (formed with secondary winding 16) and the remainder of the flashlight body. This layer of magnetic material serves to shield the main body of the flashlight from the magnetic flux and thus increases the charging efficiency and reduces the potential heating of the flashlight body.

In the embodiment described above, the electrical device being charged is a flashlight. It will be apparent to those skilled in the art, however, that the invention could equally be applied to other types of electrical devices. One other example of a device to which the invention could be applied is a camera with the secondary coil being integrated into the lens or into a lens cap, the camera could then be charged by placing the lens or lens cap (coupled to the battery in some manner) on the charging surface.

In general terms, one aspect of the present invention is the integration of the secondary coil into the device itself (or into a protective cap or the like that may be provided with the device) in a particularly suitable manner. Without necessarily being limited thereto, the invention is particularly suitable for use with devices having at least a part that is formed of a generally circular cross-section (such as the head portion of a flashlight or the lens of a camera) such that the secondary winding can easily be formed as part of the circular cross-section (or a cap or protective device that is adapted to cover that circular portion), and where the device may then easily be charged by standing the device on the charging surface by means of the circular portion. The invention could also be applied, however, to electrical devices having portions with differently shaped cross-sections, such as for example square or oval cross-sections.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. An electrical device, comprising:
    a body having a portion formed with a circumference extending about an axis;
    a rechargeable battery housed within the body;
    a first connection circuit in connection with the rechargeable battery disposed within the body; and
    a removable cap adapted to fit over and at least partly surround the body portion, the cap including:
        an integrally formed secondary winding surrounding the body portion about the axis, the secondary winding being adapted to receive magnetic flux extending from a planar charging surface;
        a layer of magnetic material disposed between the secondary winding and the body portion for reducing current induced in the body of the electrical device; and
        a second connection circuit for connecting the secondary winding to the first connection circuit so as to charge the rechargeable battery in the body;
    wherein the cap is arranged to be in contact with the planar charging surface and to support the electrical device on the planar charging surface during charging of the electrical device; and
    wherein the secondary winding is arranged to be substantially parallel to the planar charging surface so that lines of magnetic flux extending from the planar charging surface pass substantially perpendicularly through the secondary winding during charging of the electrical device.

2. An electrical device in accordance with claim 1, wherein the body portion and the secondary winding each have a generally circular cross section.

3. An electrical device in accordance with claim 1, wherein an array of primary coils that generate the lines of magnetic flux that extend generally perpendicular to the planar charging surface is disposed beneath the planar charging surface.

4. A cap for an electrical device, wherein the cap is removably fitted over and at least partly surrounding a body portion of an electrical device, the cap comprising:
    an integrally formed secondary winding surrounding the body portion, the secondary winding being adapted to receive magnetic flux extending from a planar charging surface;
    a layer of magnetic material disposed between the secondary winding and the body portion of the electrical device for reducing current induced in the body of the electrical device; and
    a connection circuit for connecting the secondary winding to the electrical device so as to charge a rechargeable battery in the electrical device;
    wherein the cap is arranged to be in contact with the planar charging surface and to support the electrical device on the planar charging surface during charging of the electrical device; and
    wherein the secondary winding is arranged to be substantially parallel to the planar charging surface so that lines of magnetic flux extending from the planar charging surface pass substantially perpendicularly through the secondary winding during charging of the electrical device.

5. An electrical device in accordance with claim 4, wherein the body portion of the electrical device and the secondary winding each have a generally circular cross section.

6. An electrical device in accordance with claim 4, wherein an array of primary coils that generate the lines of magnetic flux that extend generally perpendicular to the planar charging surface that is disposed beneath the planar charging surface.

7. An apparatus, comprising:
    a cap for an electrical device, wherein the cap is adapted to be removably fitted over and at least partly surround a body portion of an electrical device, the cap comprising:
        an integrally formed secondary winding to surround the body portion when present, the secondary winding being adapted to receive magnetic flux extending from a planar charging surface when present; and
        a layer of magnetic material situated such that when the cap is removably fitted over the body portion, the layer of magnetic material is disposed between the secondary winding and the body portion of the electrical device for reducing current induced in the body of the electrical device;
    wherein the cap is configured for placing in contact with the planar charging surface when present and to support the electrical device on the planar charging surface during charging of the electrical device; and
    wherein the secondary winding is arranged to be substantially parallel to the planar charging surface when present so that lines of magnetic flux extending from the planar charging surface pass substantially perpendicularly through the secondary winding during charging of the electrical device.

8. An apparatus in accordance with claim 7, wherein the secondary winding has a generally circular cross section.

9. An apparatus in accordance with claim 8, further comprising a body portion of an electrical device usable with the cap, the body portion having a generally circular cross section.

10. An apparatus in accordance with claim 7, further comprising a connection circuit for connecting the secondary winding to the electrical device when present so as to charge a rechargeable battery in the electrical device.

11. An apparatus in accordance with claim 7, further comprising a planar charging surface having an array of primary coils disposed beneath the planar charging surface that generate the lines of magnetic flux that extend generally perpendicular to the planar charging surface.

\* \* \* \* \*